C. VAN HAAGEN.
Slide-Rests for Lathes.
No. 136,794.
Patented March 11, 1873.
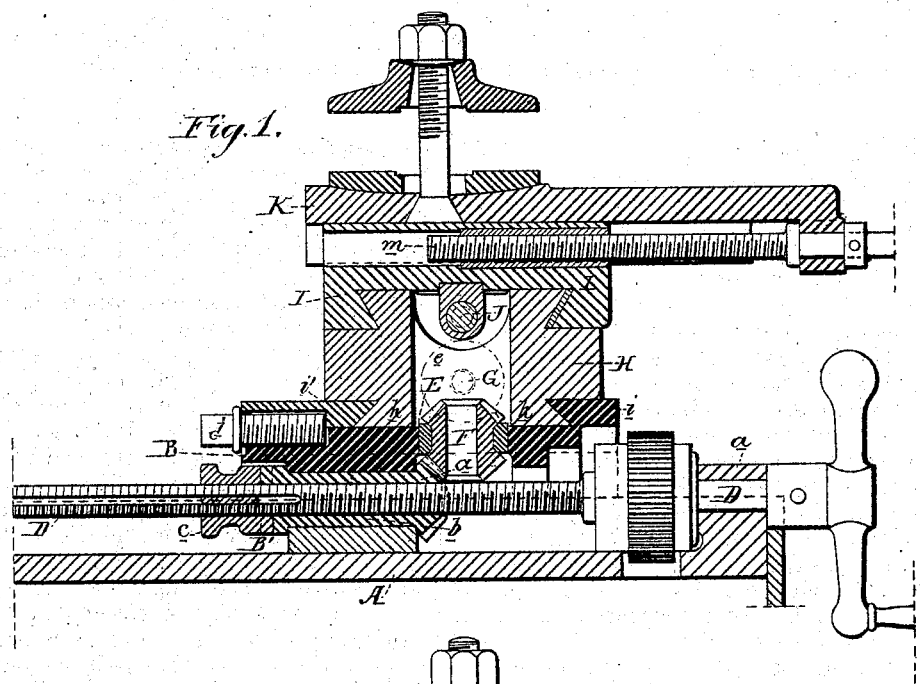
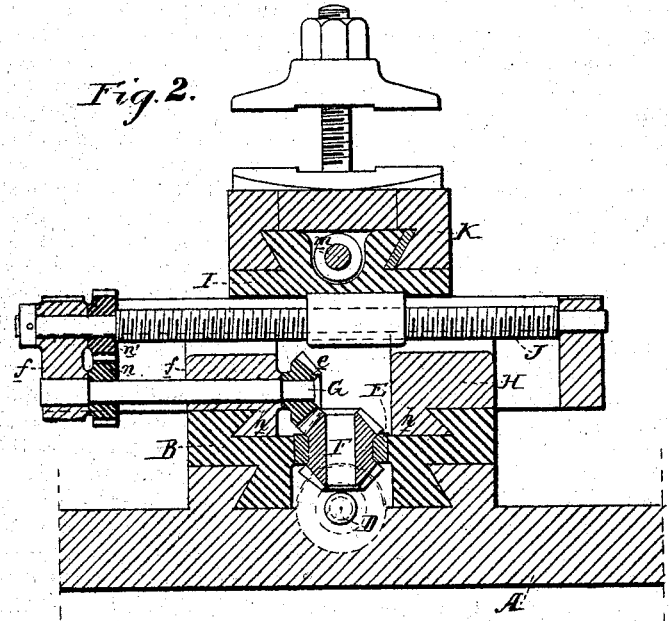
Witnesses,
Thomas McIlvain
Harry Smith
Claus Van Haagen
by his Attr,
Howson and Son

UNITED STATES PATENT OFFICE.

CLAUS VAN HAAGEN, OF PHILADELPHIA, PENNSYLVANIA, ASSIGNOR TO HIMSELF AND ANTHONY VAN HAAGEN, OF SAME PLACE.

IMPROVEMENT IN SLIDE-RESTS FOR LATHES.

Specification forming part of Letters Patent No. 136,794, dated March 11, 1873.

*To all whom it may concern:*

Be it known that I, CLAUS VAN HAAGEN, of Philadelphia, Pennsylvania, have invented a Compound Slide-Rest, of which the following is a specification:

The object of my invention is to make the tool of a slide-rest traverse automatically at any angle desired; and this object I attain by means of a bed, H, carrying the upper slide L, arranged to be turned on the lower slide B, in combination with mechanism described hereafter, whereby the motion of the screw-shaft D, which controls the lower slide, may be communicated to the screw-shaft J, which controls the upper slide. The base A of the slide-rest is adapted to the bed of the lathe in the same manner as the bases of ordinary slide-rests, and to beveled guides on this base is adapted the slide B. In a projection, $a$, on the base A turns a screw-shaft, D, which can be driven from the lathe, the threaded portion of the shaft passing through a sleeve, $b$, having an internal screw-thread corresponding with that of the shaft; and this sleeve is adapted to a bearing in the slide B and in a sliding block, B'. (See Fig. 1.) A clutch, $c$, is arranged to slide freely over the threads of the screw D, but cannot turn independently of the same, the teeth of this clutch being adapted to similar teeth on the end of the sleeve $b$. When the clutch is out of gear with the sleeve the latter becomes the nut of the screw-shaft D, by turning which the slide B of the rest may be moved to and fro at right angles to the bed of the lathe. When the clutch is in gear with the sleeve, however, the latter must revolve with the screw-shaft D without disturbing the slide B, in which is a circular opening for receiving a split ring, E, the latter forming the bearing for the duplex bevel-wheel F, into the lower end of which gears a similar wheel on or forming a part of the above-mentioned sleeve $b$; the upper end of the duplex wheel gearing into another bevel-wheel, $e$, on the shaft G, which is arranged to turn in bearings $f$ $f$ on the bed H, the latter having a circular projection, $h$, with beveled edges adapted to a beveled segmental shoulder, $i$, on the slide B, to which it is confined by the follower $i'$ and a set-screw, $j$. To beveled guides on the top of the bed H is fitted a slide, I, controlled by a screw-shaft, J, which is arranged to turn in bearings on the bed H, motion being communicated from the shaft G to the screw-shaft J by ordinary cog-wheels $n$ and $n'$. (See Fig. 2.) K is the tool-carrying slide adapted to beveled guides on the slide I, and controlled by a screw-shaft, $m$, in a manner common to other slide-rests.

It will be seen that the slide I can be made to traverse at any desired angle on simply turning the bed H on the slide B to the required position and securing it after adjustment by the set-screw $j$, the gearing for transmitting motion to the slide I being undisturbed by such movement of the bed; for when the clutch $c$ is in gear with the sleeve $b$, and the shaft D is turned, a rotary motion will be communicated to the screw-shaft J through the wheels, $a$ F, $e$, $n$, and $n'$; and, as the circular projection $h$ is concentric with the center of rotation of the duplex wheel F, no change in the angle of the slide I can effect the gearing. The shaft D is supposed to derive its motion from the lathe, and to admit of being reversed at pleasure by any suitable mechanism heretofore employed for operating the lower slide of a slide-rest from a lathe. When the tool is required to traverse in a course at right angles to the bed of the lathe the clutch $c$ is drawn out of gear with the sleeve $b$ when the latter becomes the stationary nut for the screw-shaft D; but when the slide I has to traverse at the angle to which it has been adjusted the clutch is pushed into gear with the sleeve, the slide B becomes stationary, and motion is communicated in the manner before described to the screw-shaft J.

The manner of confining the duplex wheel F to its place in the slide B may be briefly alluded to. The bearing of this wheel consists of a ring, E, and this ring is made in two parts, so that it can be first adjusted to the wheel, and then driven into the circular opening of the slide B, after which it may be secured by a key, care being taken that, while the ring fits tightly in the opening, it shall not embrace the wheel too closely to prevent the latter from turning freely.

As before remarked, the circular projection $h$ of the bed H is confined to its place on the slide B by a follower, $i'$, in the under side of which fits freely one-half of the set-screw $j$, the threads of which are adapted to a threaded recess in the slide, the follower having no thread. On unscrewing the set-screw $j$ the bed H will be relieved from the pressure of the follower, and may be turned freely; but on tightening the screw the follower will be forced against the bed, and the latter will be firmly held in its position.

I claim as my invention—

1. The bed H carrying the slide I and admitting of being turned on the slide B, in combination with the mechanism described, or any equivalent to the same, whereby motion is communicated from the screw-shaft for operating the lower slide to the screw-shaft for controlling the upper slide, all substantially as set forth.

2. The sleeve $b$ adapted to the slide B geared to the screw-shaft for controlling the upper slide I, and having an internal thread adapted to the screw for controlling the lower slide, in combination with the clutch $c$, or its equivalent, for throwing the said sleeve in and out of gear with the said screw-shaft D.

3. The duplex wheel F and its bearing E, composed of a severed ring fitted to an opening in the slide B, all as set forth.

4. The circular projection $h$ of the bed H, adapted to a segmental shoulder, $i$, on the slide B, in combination with the follower $i'$ and screw $j$.

In testimony whereof I have signed my name to this specification in the presence of two subscribing witnesses.

C. VAN HAAGEN.

Witnesses:
WM. A. STEEL,
HUBERT HOWSON.